(12) United States Patent
Yu et al.

(10) Patent No.: US 8,151,648 B2
(45) Date of Patent: Apr. 10, 2012

(54) ULTRA-MINIATURE FIBER-OPTIC PRESSURE SENSOR SYSTEM AND METHOD OF FABRICATION

(75) Inventors: Miao Yu, Potomac, MD (US); Hyungdae Bae, College Park, MD (US); Xuming Zhang, Hyattsville, MD (US)

(73) Assignee: University of Maryland, College Park, MD (US)

( * ) Notice: Subject to any disclaimer, the term of this patent is extended or adjusted under 35 U.S.C. 154(b) by 64 days.

(21) Appl. No.: 12/849,436

(22) Filed: Aug. 3, 2010

(65) Prior Publication Data

US 2011/0023617 A1 Feb. 3, 2011

Related U.S. Application Data

(60) Provisional application No. 61/230,899, filed on Aug. 3, 2009.

(51) Int. Cl.
*G01L 9/00* (2006.01)
*G02B 6/00* (2006.01)
(52) U.S. Cl. ............................... 73/705; 385/12; 29/592
(58) Field of Classification Search ........................ None
See application file for complete search history.

(56) References Cited

U.S. PATENT DOCUMENTS

| | | | | |
|---|---|---|---|---|
| 5,844,667 | A * | 12/1998 | Maron | 356/35.5 |
| 6,016,702 | A * | 1/2000 | Maron | 73/705 |
| 6,131,465 | A * | 10/2000 | Wlodarczyk et al. | 73/715 |
| 6,218,661 | B1 * | 4/2001 | Schroeder et al. | 250/227.14 |
| 6,506,313 | B1 * | 1/2003 | Fetterman et al. | 216/24 |
| 6,597,821 | B1 * | 7/2003 | Bohnert et al. | 385/12 |
| 6,820,488 | B2 * | 11/2004 | Lenzing et al. | 73/705 |
| 7,689,071 | B2 * | 3/2010 | Belleville et al. | 385/13 |
| 2004/0031326 | A1 * | 2/2004 | Lenzing et al. | 73/800 |
| 2005/0041905 | A1 * | 2/2005 | Lagakos et al. | 385/12 |

* cited by examiner

*Primary Examiner* — Andre Allen
(74) *Attorney, Agent, or Firm* — Rosenberg, Klein & Lee

(57) ABSTRACT

Ultra-miniature surface-mountable Fabry-Perot pressure sensor is constructed on an optical fiber which utilizes a 45° angled fiber tip covered with a reflective layer which steers the optical axis of the fiber by 90°. The Fabry-Perot cavity is formed on the sidewall of the fiber and a polymer-metal composite diaphragm is formed on the top of the Fabry-Perot cavity to operate as a pressure transducer. The sensor exhibits a sufficient linearity over the broad pressure range with a high sensitivity. The sensitivity of the sensor may be tuned by controlling the thickness of the diaphragm. The sensor may be used in a wide range of applications, including reliable in vivo low invasive pressure measurements of biological fluids, single sensor systems, as well as integral spatial-division-multiplexing sensor networks. Methods of batch production of uniform device-to-device Fabry-Perot pressure sensors of co-axial and cross-axial configurations are presented.

20 Claims, 9 Drawing Sheets

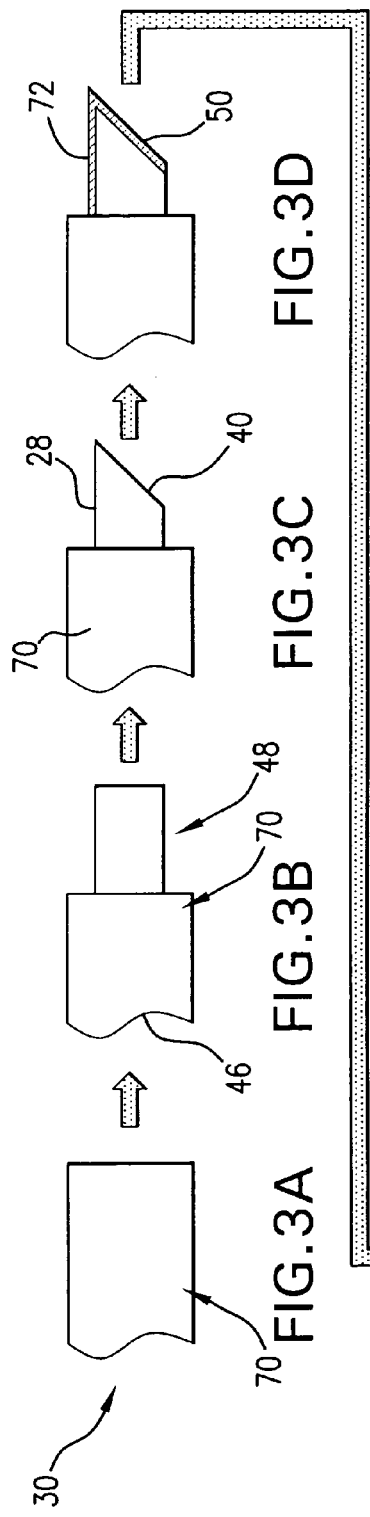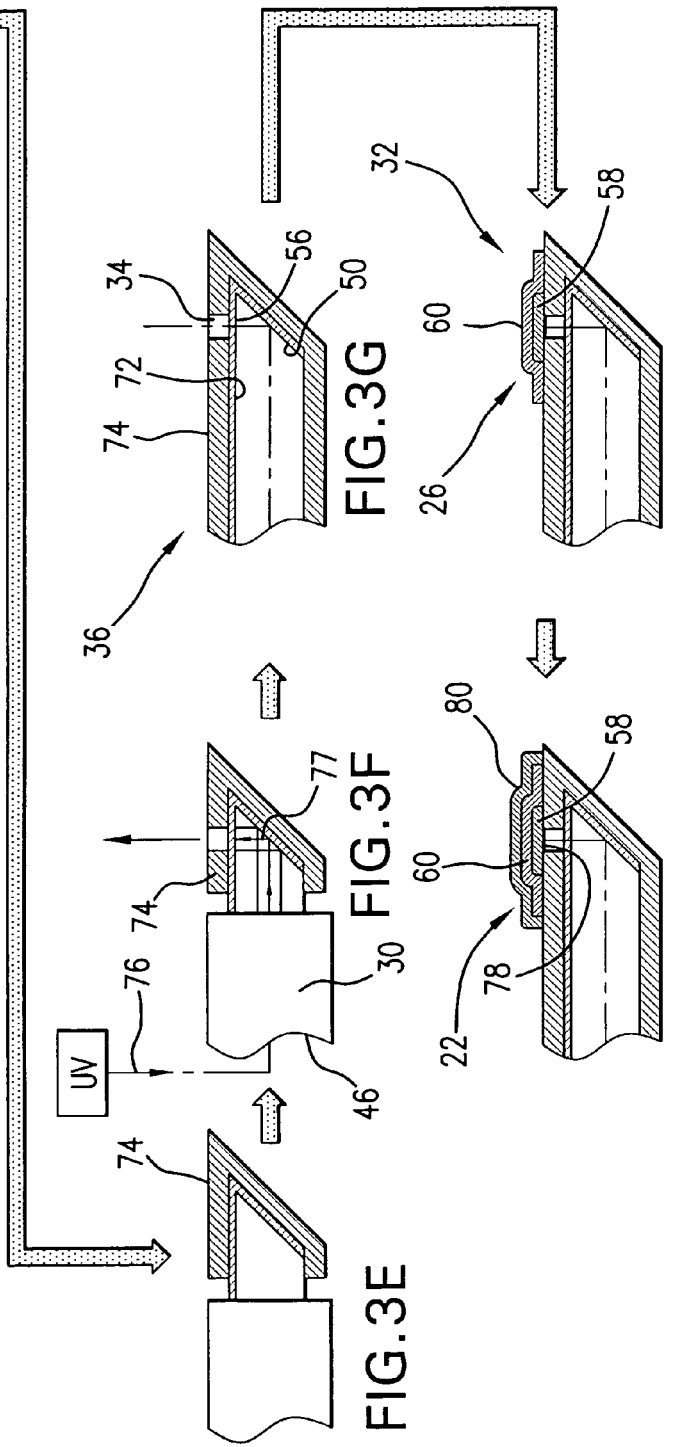

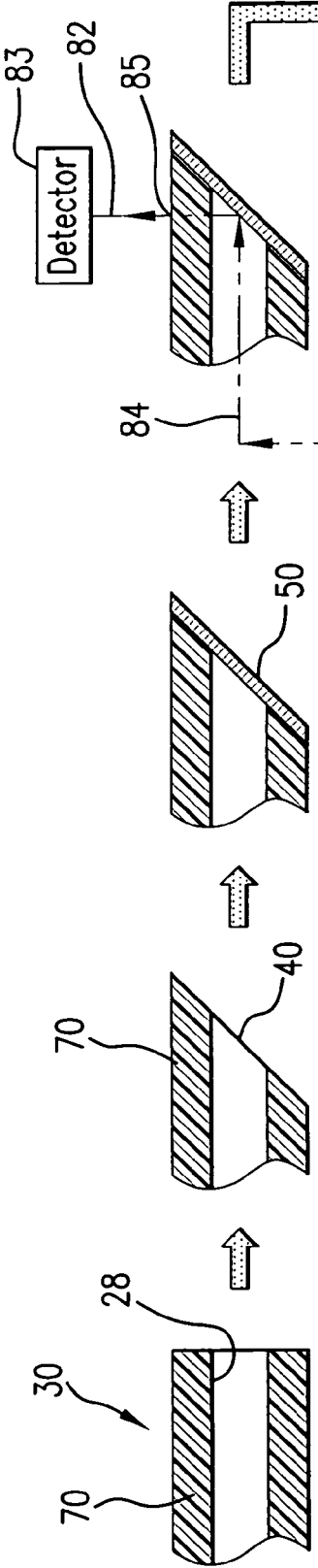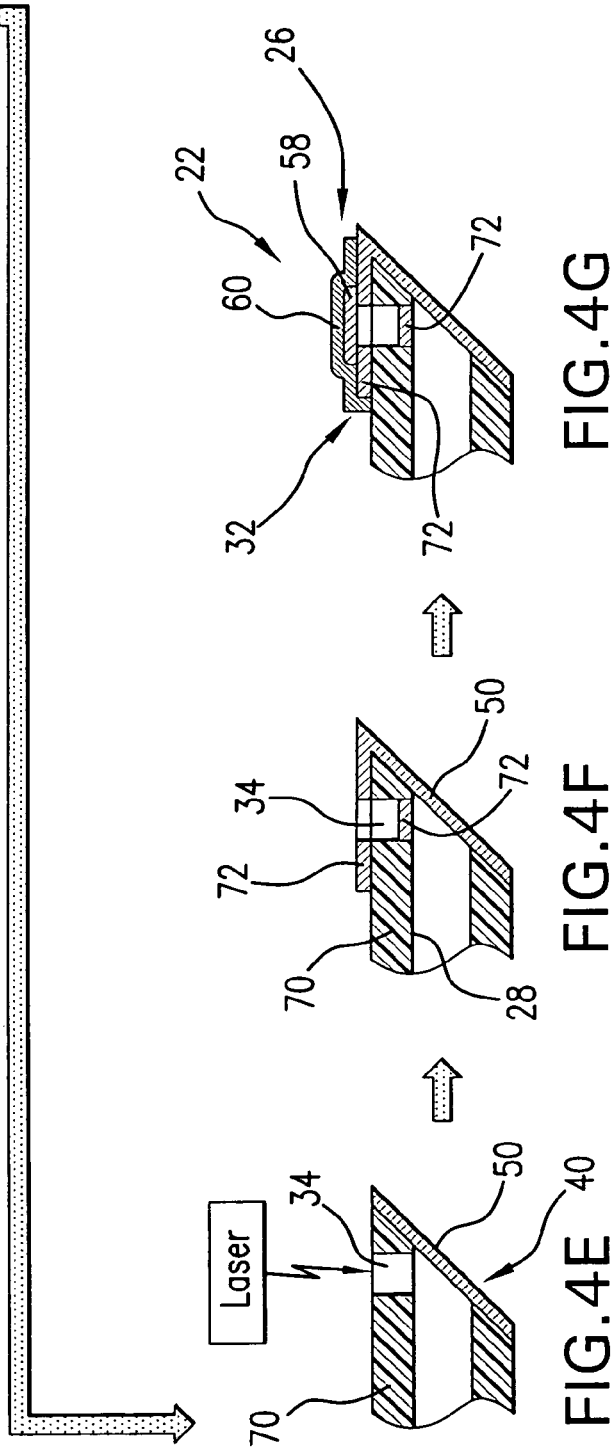

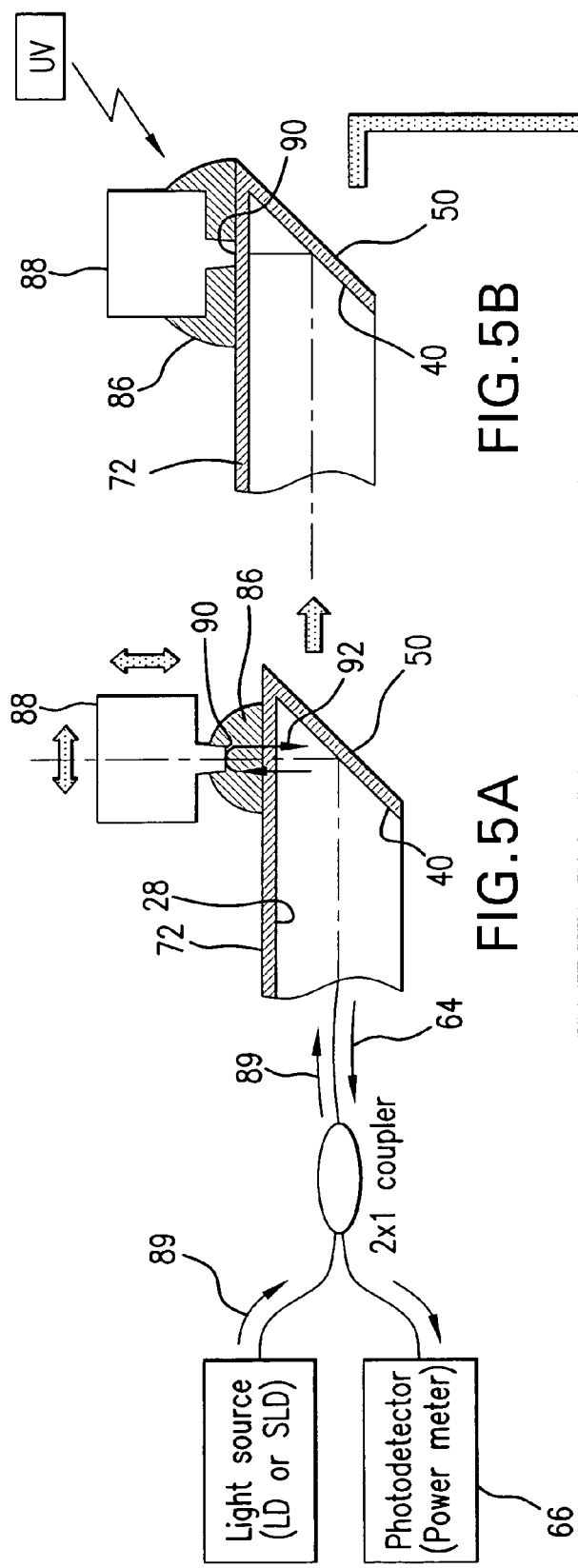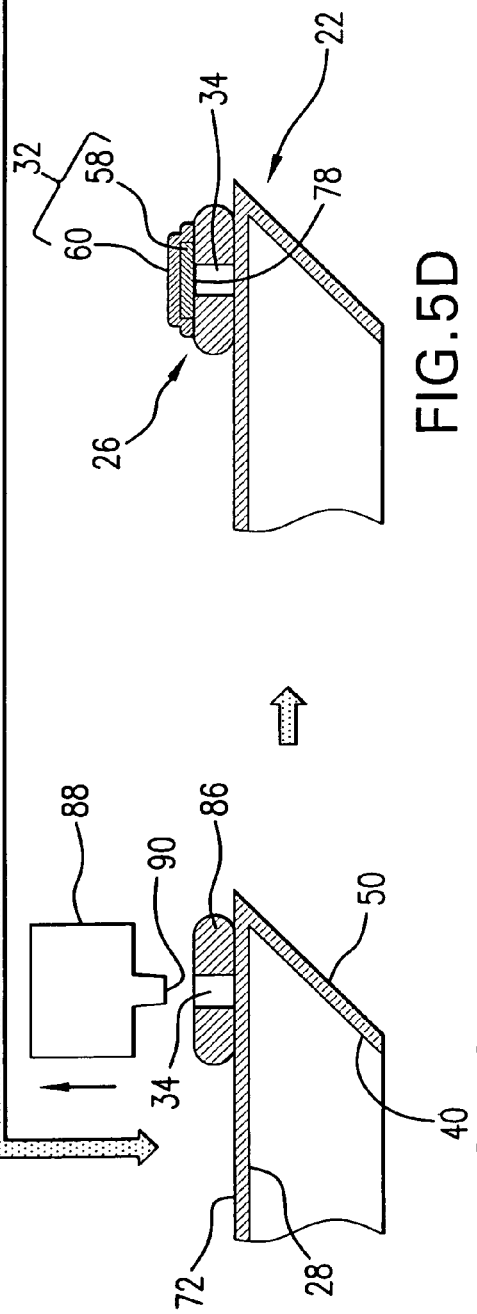

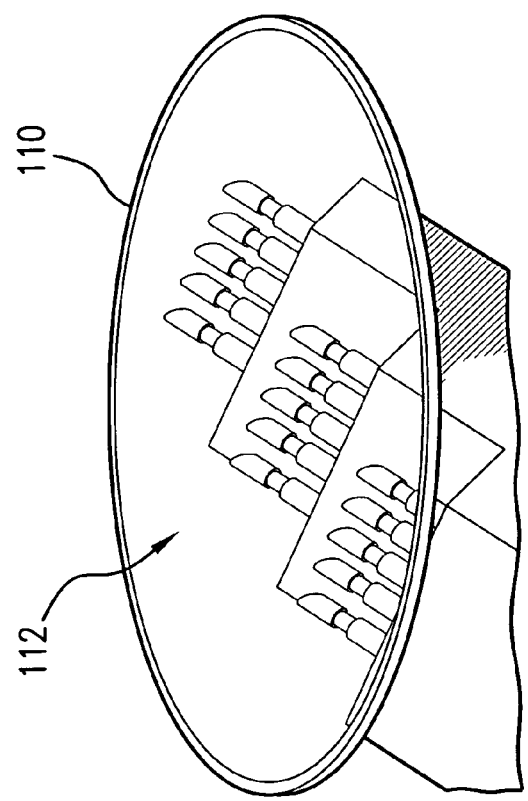
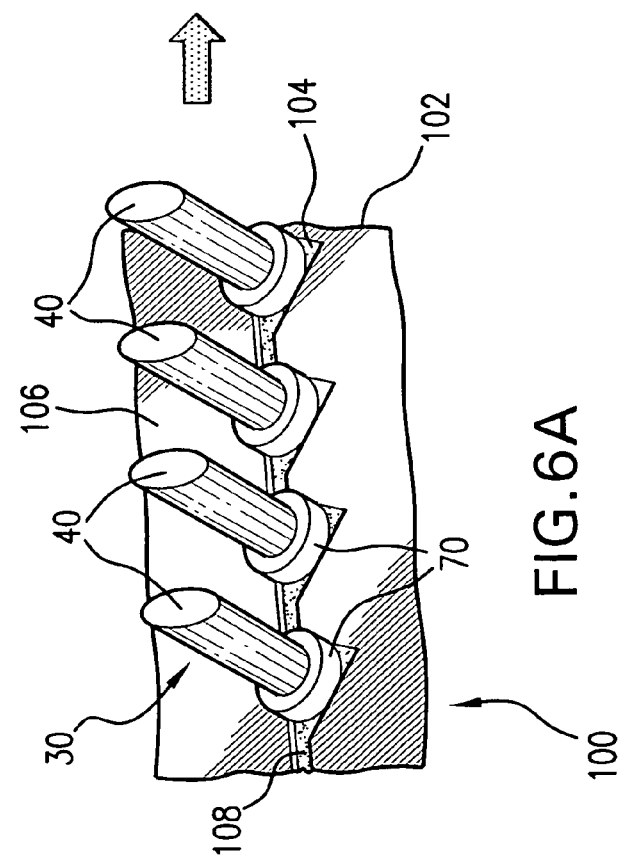
FIG.6A
FIG.6B

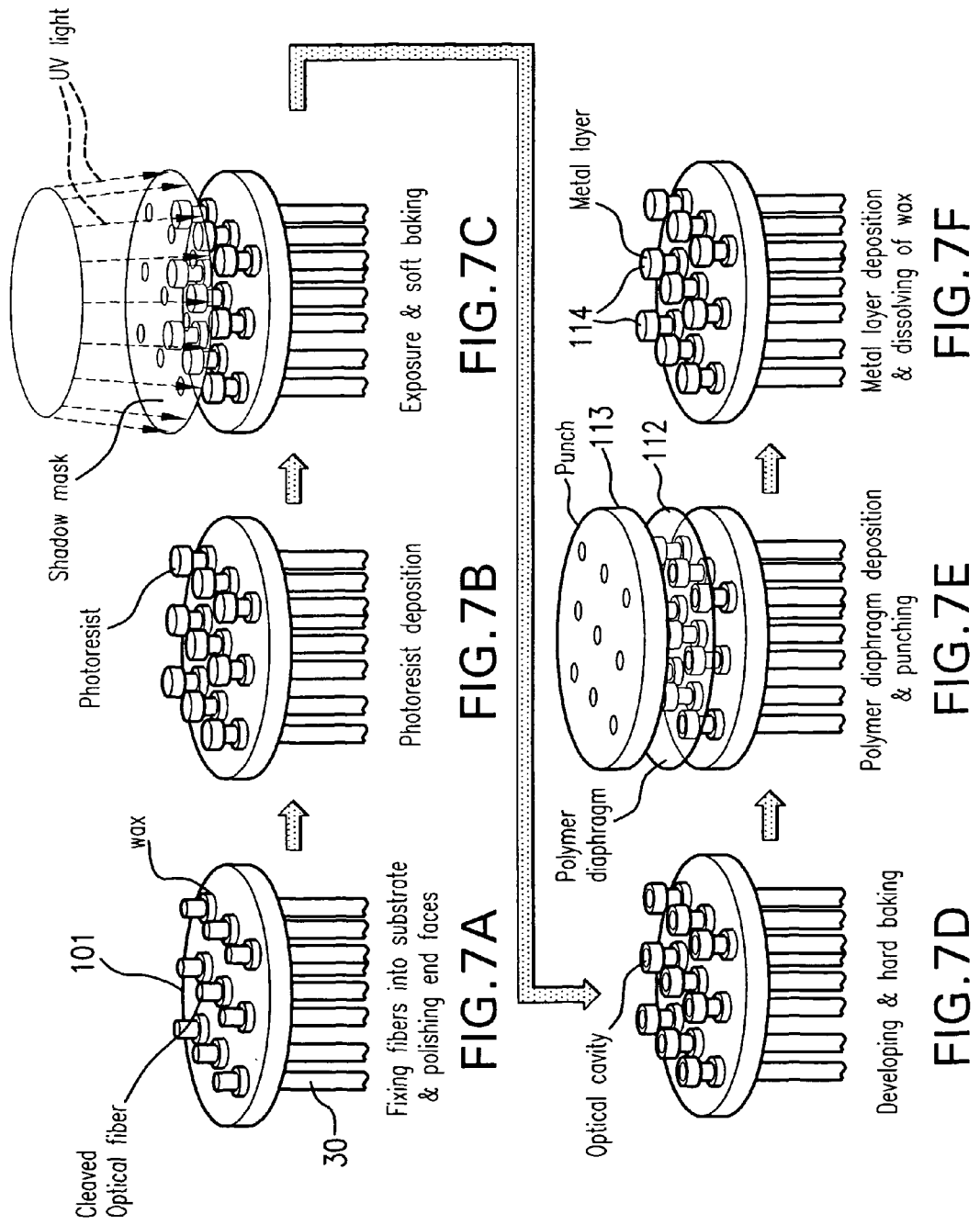

ULTRA-MINIATURE FIBER-OPTIC PRESSURE SENSOR SYSTEM AND METHOD OF FABRICATION

REFERENCE TO RELATED APPLICATIONS

This Utility Patent Application is based on U.S. Provisional Patent Application No. 61/230,899 filed on 3 Aug. 2009.

The U.S. Government has certain rights to the invention. The work was funded by NSF Contract No. CMMI0644914.

FIELD OF THE INVENTION

The present invention relates to microsensors, and more in particular, to ultra-miniature pressure sensors formed on optical fibers.

In overall concept, the present invention is directed to an ultra-miniature pressure sensor system in which a sensor element (sensing head) features a low-finesse Fabry-Perot cavity formed on an optical fiber and a thin (nanometer-scale to micrometer scale) metal-polymer composite diaphragm covered on the cavity top.

Additionally, the present invention relates to a surface-mountable fiber-optic ultra-miniature Fabry-Perot pressure sensor that utilizes internal reflection at a 45° angled fiber end surface to steer the optical axis by 90° in order to redirect the light travelling along the optical guide channel to impinge on the fiber sidewalls at a location where a Fabry-Perot cavity is formed and covered with a polymer-metal composite diaphragm serving as a pressure transducer to detect pressure whose direction is perpendicular to a surface of interest.

The present invention is further directed to ultra-miniature pressure sensors which are suitable for space-constrained biomedical applications that require minimally invasive, in vivo pressure monitoring of body fluids, and are envisioned in a broad range of highly sensitive pressure measurements in a single sensing head structure or as sensing networks capable of interrogating an array of sensing heads in question.

Additionally, the present invention is directed to a fabrication method for a surface-mountable ultra-miniature fiber-optic pressure sensor system having high sensitivity which may be used as miniature microphones for various surveillance and industry applications as well as for aerodynamic measurements without disturbing a measurand while being electromagnetic interference resistant.

The present invention is further directed to a simple and inexpensive batch production of pressure microsensors which yields high device-to-device uniformity.

BACKGROUND OF THE INVENTION

Fiber optic sensors are widely used due to their light weight, miniature dimensions, low power consumption, electromagnetic interference resistance, high sensitivity, wide bandwidths and environmental ruggedness in combination with low cost and well developed fabrication techniques. Among fiber optic sensors. Fabry-Perot based pressure transducers are widely used for localized measurements free of a measurand disturbance. This type of sensor detects changes in optical path length induced by a change in the refractive index or a change in physical length of the Fabry-Perot cavity. The Fabry-Perot sensors are attractive for their miniature size, low cost of the sensing element, and compatibility with low coherence light sources, such as light emitting diodes.

In Fabry-Perot cavity based sensors, pressure is measured by detecting deflection of a membrane to which the pressure is applied. By using the optical measurements, a remote data acquisition may be achieved without loss of signal-to-noise ratio. Shown in FIG. 1, is a co-axial configuration of fiber pressure sensor which has a Fabry-Perot cavity 10 formed at the end of the optical fiber 12. The cavity 10 is surrounded by a housing 14 and is covered by a diaphragm 16. In this co-axial configuration, the optical characteristics of the light traveling along the fiber optical guide channel 18 are responsive to the pressure field having a direction parallel to the optical axis of the fiber. These co-axially configured fiber sensors are not surface-mountable.

It would be highly desirable to combine the attractive characteristics of the fiber based ultra-miniature pressure sensors with the ability of being surface-mountable to sense and measure pressure fields directed perpendicularly to the surface.

SUMMARY OF THE INVENTION

It is therefore an object of the present invention to provide a surface-mountable ultra-miniature fiber-optic pressure sensor system capable of optical measurements of pressure fields directed perpendicular to the surface of interest.

It is a further object of the present invention to provide a unique fabrication technique for a surface-mounted ultra-miniature fiber-optic pressure sensor system where each sensor element features a low-finesse Fabry-Perot cavity structure formed externally to the fiber sidewall in cross-axial relationship with the optical axis of the fiber.

It is another object of the present invention to provide a fiber optic pressure sensor system in which a surface-mountable sensing head has a 45° angled fiber end surface utilized to redirect the light within the optical fiber to impinge onto the sidewall at a location where the Fabry-Perot cavity structure is formed for sensing a pressure field applied thereto.

It is also an object of the present invention to provide a fabrication technique which permits batch production of ultra-miniature fiber-optic pressure sensors, both co-axial and surface-mountable, that yields high device-to-device uniformity in an efficient fashion.

It is another object of the present invention to provide a biologically compatible ultra-miniature fiber-optic pressure sensor system suitable for low-invasive measurements in medical in vivo applications.

It is an additional object of the present invention to provide a Spatial-Division-Multiplying (SDM) sensor network capable of high performance interrogation of a plurality of ultra-miniature fiber-optic surface-mountable pressure sensors.

In one aspect, the present invention is directed to a pressure sensor system, which utilizes one or more ultra-miniature surface-mountable sensing heads, each formed on an optical fiber with the tip contoured with an end surface angled at 45° relative to the longitudinal axis of the optical fiber and covered with a reflective material. The operation of the sensing head is based on a Fabry-Perot cavity structure which is located externally on the sidewall of the optical fiber and has a diaphragm covering the cavity. A specific location of the Fabry-Perot cavity structure at the sidewall of the fiber is defined at a spot where the light traveling along the optical guide channel of the optical fiber and being redirected by the angled reflective end surface, impinges on the sidewall of the optical fiber.

The pressure applied to the diaphragm on the top of the Fabry-Perot cavity changes the optical characteristics of the light signal traveling in the optical fiber, and thus may be detected by a light detector coupled to the fiber output optical signal. The detected output light signal is further processed to transform the changes in the optical signal characteristics into an applied pressure.

The Fabry-Perot cavity structure includes an optical cavity defined in a cavity confining layer formed externally of the fiber sidewall and a polymer-metal composite diaphragm covered on the top of the optical cavity. The composite polymer-metal diaphragm is a thin membrane of nanometer-scale to micrometer-scale uniform thickness which may be covered with one or more additional polymer layers to enhance mechanical stability, provide biological compatibility of the sensing head, as well as to fine tune the sensitivity of the sensing head by controlling the number of additional polymer layers on the diaphragm.

The cavity confining layer formed on the sidewall of the optical fiber may be of a photoresistive nature. Alternatively, the optical cavity may be formed in a jacket of the optical fiber, or in a UV-curable material deposited on the sidewall. A reflective layer is preferably positioned at the bottom of the optical cavity to enhance visibility of an optical signal by increasing reflectance of the outer surface of the optical fiber.

The sensing head is surface-mountable and may be installed on a substrate to sense the pressure field applied to the diaphragm in a direction perpendicular to the substrate surface. A light source generating an optical input signal coupled to the input end of the optical fiber, a light detector to detect the optical signal emanating from the optical fiber, and a signal processing unit coupled to the light detector for determining the characteristics of the optical output signal are envisioned in systems using a single sensing head or in sensor networks.

Another aspect of the present invention constitutes a method for manufacturing a surface-mountable ultra-miniature fiber-optic pressure sensor, which is carried out by the steps of:
  contouring a tip of an optical fiber with an end surface angled at 45° relative to the optical guide channel;
  covering the angled end surface with a reflective material;
  optically coupling a light beam to an input end of the optical fiber so that the light beam travels from the input end to the tip of the optical fiber along the optical guide channel and redirects at the reflective angled end surface toward the sidewall of the optical fiber; and
  fabricating a Fabry-Perot cavity structure at the spot where the redirected light impinges on the sidewall of the fiber. The Fabry-Perot cavity structure is formed by a cavity and a diaphragm covering a top of the cavity.

There are several alternative approaches, to carrying out the fabrication of the sensing head in question. In one of the approaches the cavity may be formed within the fiber jacket. In this case, the laser beam is transmitted from the input end of the optical fiber to the angled reflective surface, and the location of the Fabry-Perot cavity structure is found by sensing the laser beam emanating through the sidewall of the optical fiber. At the location where the laser beam is sensed, the Fabry-Perot cavity structure is formed by a subtraction technique applied to the fiber jacket, including laser ablation, wet and dry etching, or photoresist developing technique.

Alternatively, the optical Fabry-Perot cavity may be formed in a photoresist covering the sidewall of the optical fiber. In this embodiment, prior to the contouring the tip end of the optical fiber with the reflective angled surface, the fiber jacket is removed, the exposed sidewall is covered with a reflective material, and a photoresist layer is deposited on the sidewall reflective layer. Then, the UV light beam is coupled to the input end of the optical fiber, and, being redirected at the reflective angled end surface, is incident on the sidewalls of the optical fiber, so that the UV patterning of the photoresist layer takes place. The photoresist layer is a positive resist, and when being exposed to light, becomes soluble to a photoresist developer. The patterned photoresist layer is further exposed to a developer to remove the soluble matter, thereby creating a cavity within the photoresist.

In a further embodiment, the fiber jacket is peeled from the optical fiber, a reflective layer is deposited on the exposed sidewall, and a predetermined volume of a UV-curable material is deposited on the reflective layer. A mold contoured oppositely to the shape of the desired Fabry-Perot cavity is then aligned with the intended cavity location and is lowered into the UV-curable material. After the UV-curing is performed, the mold is removed.

Upon forming a cavity by any of these techniques, a composite diaphragm formed of a polymer diaphragm layer and a reflective diaphragm layer is covered on the top opening of the Fabry-Perot cavity. The polymer diaphragm layer is preformed separately to have a uniform thickness in a nanometer-scale range.

The present invention further is directed to a method of batch fabrication of a plurality of ultra-miniature fiber-optic pressure sensors, yielding high uniformity of device-to-device dimensional and operational characteristics. The hatch fabrication includes the steps of:
  securing a plurality of optical fibers (with the jacket peeled from the tips) in a fiber holder in aligned disposition each with respect to the other, and
  polishing the tips of the optical fibers to form end surfaces angled either at 45° or 90° relative to the optical guide channel. Thus the subject batch production method is applied to fabrication of both the cross-axial configuration and co-axial configuration of the sensing heads.

For the cross-axial configuration, the method further includes the steps of:
  depositing a reflective layer on the 45° angled end surfaces of the optical fibers,
  depositing a sidewall reflective layer on the fibers sidewalls,
  forming a photoresist layer on the sidewall reflective layer of the fibers,
  coupling a light beam into the optical fibers at the input ends to pattern the photoresist at a location of the Fabry-Perot cavity structure to be formed, and
  developing the patterned photoresist on fibers, thus simultaneously forming Fabry-Perot cavities at the sidewalls of the plurality of fibers.

For the mass production of the co-axially configured sensing heads, after polishing the end face perpendicular to the optical axis of the fibers, the method further proceeds in the following fashion:
  depositing a photoresist on the end faces of the fibers;
  exposing the end faces though a shadow mask to pattern the photoresist on the end faces in accordance with the desired dimensions of the Fabry-Perot cavities to be formed; and
  developing the exposed photoresist to form co-axial Fabry-Perot cavities extending through the thickness of the photoresist layer co-axially to the optical guide channels of the fibers.

Upon forming the Fabry-Perot cavities at the fibers (either on the sidewalls or at the end face), the method further includes the steps of:
  pre-forming a thin polymer film of a uniform thickness (the thickness may range in nm to μm scale),
  attaching the polymer film on the cavities of the plurality of optical fibers, thus forming polymer diaphragm layer, and coating a reflective diaphragm layer on the patches of the polymer diaphragm layer on the cavities.

The reflective layer may be coated on the angled end surface, as well as on the sidewall and on the polymer diaphragm layer by any technique including sputtering, evaporation, electroplating, bonding or sticking.

These and other features and advantages of the present invention will be apparent from the following detailed description taken in conjunction with accompanying Patent Drawings.

BRIEF DESCRIPTION OF THE DRAWINGS

FIGS. 3A-3I represent a sequence of the manufacturing steps of the present method in one embodiment thereof;

FIGS. 4A-4G show in sequence the manufacturing steps of the present method in an alternative embodiment;

FIGS. 5A-5D show in sequence the manufacturing steps of the present method in yet another alternative embodiment;

FIGS. 6A-6B are prospective views of fabrication tools for batch production of the sensors of the present invention;

FIGS. 7A-7F show in sequence the manufacturing steps of an alternative embodiment of the batch fabrication method in accordance with the present invention;

DETAILED DESCRIPTION OF THE PREFERRED EMBODIMENTS

Figure 1:
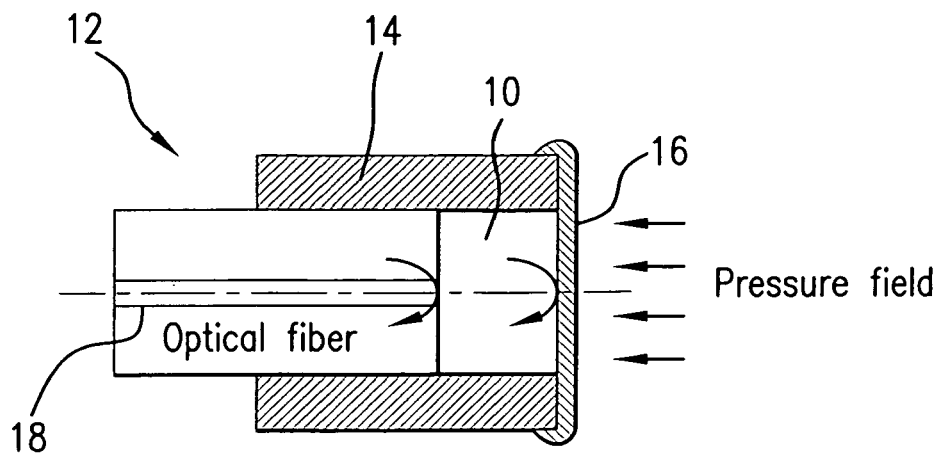
FIG. 1 is a schematic representation of a coaxial configuration of a conventional fiber-optic pressure sensor.
Figure 2:
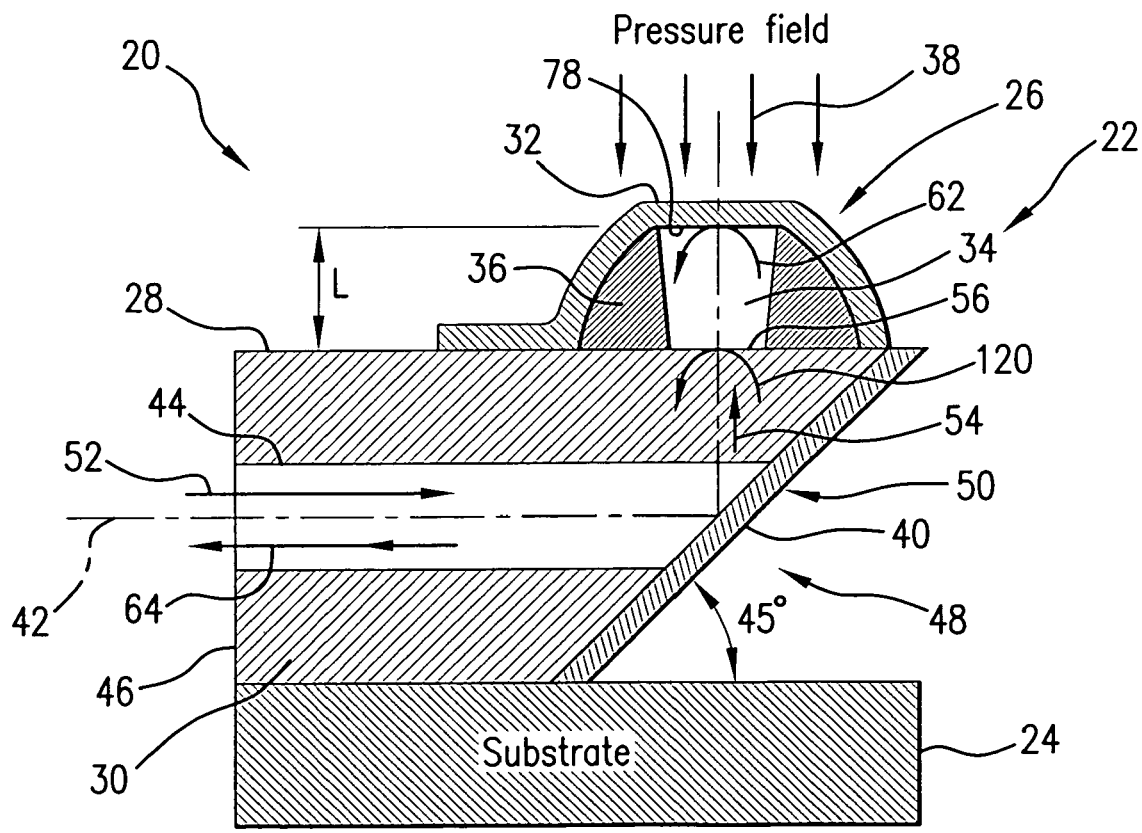
FIG. 2 is a schematic representation of a surface-mountable sensing head with a cross-axial configuration of the present invention.

Referring to FIG. 2, an ultra-miniature pressure sensor system 20 includes a sensing head 22 which is uniquely designed to permit surface mountability on a substrate 24 due to its cross-axial configuration. Each sensing head 22 features a low finesse Fabry-Perot cavity structure 26 formed externally at the sidewall 28 of the optical fiber 30 and a metal-polymer composite diaphragm 32 of a nanometer-scale to a micrometer-scale thickness which is covered on the optical cavity 34 of the Fabry-Perot cavity structure 26. The optical cavity 34 is formed within a cavity confining layer 36 as will be presented in detail in the following paragraphs. The sensing head 22 is mounted on the surface of the substrate 24 to detect pressure 38 applied to the diaphragm 32 in the direction perpendicular to the substrate surface.

The diaphragm thickness, cavity diameter and cavity length may be easily adjusted during the manufacturing process to fulfill the requirements of different sensitivity and measurement range in various applications. For example, the resulting cavity length may vary from several micrometers to several tens of micrometers, which may be adjusted based on the intended application of the sensor by controlling the thickness of the cavity confining layer 36.

It is expected that the subject ultra-miniature fiber-optic pressure sensor 22 may be used in array systems applicable in a wide variety technology areas. For example, biologically compatible diaphragm materials may be used to produce the sensor suitable for space-constrained medical diagnosis and treatment applications that require minimally invasive, in vivo, monitoring of the pressures of blood, bones, joints, and bladder, etc. Further, the sensor system may be used for aerodynamic measurements without disturbing measurand and being free of electromagnetic interferences/disturbances.

Sensors with the thin diaphragm in the range of nanometers have high sensitivity and may be used as miniature microphones for various surveillance and industry applications. The unique fabrication technique for the sensor development presented in detail infra, includes simple processes, safe procedures, and inexpensive materials, and does not need the use of a clean room environment and associated equipment.

Referring again to FIG. 2, the cross-axial configured sensing head 22 has an end surface 40 which is angled 45° relative to the optical axis 42 of the optical fiber 30, e.g. relative the optical guide channel 44 extending between an input end 46 and a tip 48 of the optical fiber 30.

A thin reflective coating 50 preferably in the film range, is deposited at the end surface 40 to enhance reflection of light 52 traveling along the optical guide channel 44. Since the end surface is positioned at 45° relative to the optical axis 42, the light beam 52 is redirected to travel at 90° relative to the optical axis 42. The redirected light beam 54 impinges on the sidewall 28 of the optical fiber at a location 56 which is defined as the location where the Fabry-Perot cavity structure 26 is formed, as will be described herein in further paragraphs.

As shown in FIGS. 3H-3I, 4G and 5D, the diaphragm 32 includes a polymer diaphragm layer 58 and a reflective diaphragm layer 60 covered on the polymer diaphragm layer 58. As shown in FIG. 2, when the redirected light beam 54 impinges on the diaphragm 32, it reflects (as shown by the arrow 62) and is returned to the end surface 40 to be redirected to the input end of the optical fiber along the optical guide channel 44. Thus produced light signal constitutes an output optical signal 64 which is interrogated by a spectrometer 122 (or an optical spectrum analyzer), shown in FIG. 8A, or a photo detector 123, shown in FIG. 9, and discussed infra herein. The photo detector may be any detector which covers the wavelength range of the output optical signal. For example, a GaAs or InGaAs photo detector with the working range of 600-800 nm and 800-1600 nm, respectively, may be used.

Figure 9:
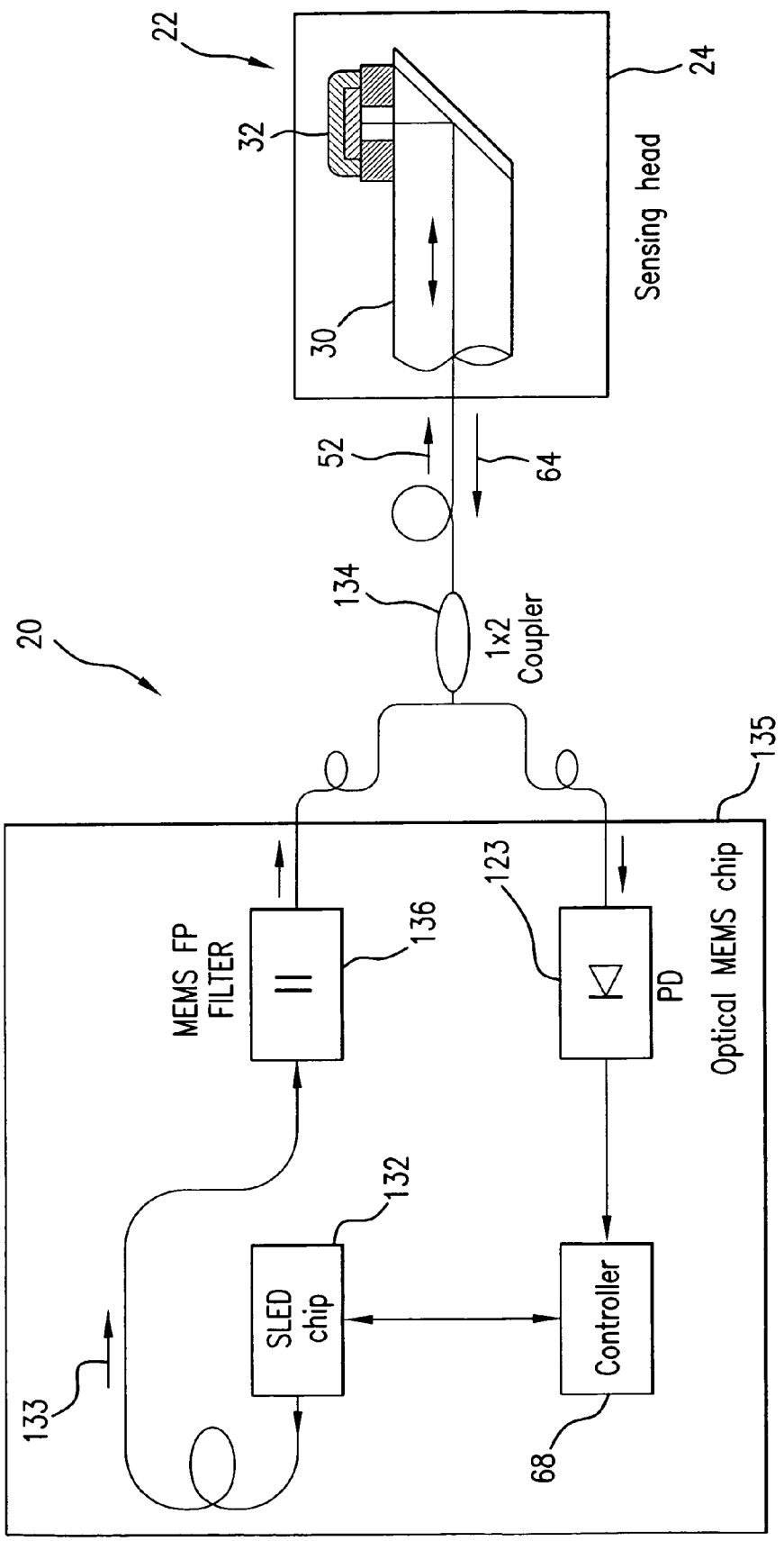
FIG. 9 is a schematic representation of a sensor system using the sensing head of the present invention.

The optical characteristics of the output optical signal 64, including intensity of the signal and spectrum parameters, depend on the length of the Fabry-Perot cavity. When the pressure 38 is applied to the composite diaphragm 32, the diaphragm bends into the cavity 34, thereby reducing the length L of the cavity, and thereby changing the optical path of the light. The change of the optical path will change the phase of the reflected signal 62, and subsequently the optical characteristics of the output optical signal 64 detected by the spectrometer (or optical spectrum analyzer) 122 or the photo diode 123 and determined by a microcontroller (or microprocessor) 68 coupled to the photo diode, as shown in FIG. 9. The output optical signal characteristics are processed to produce the corresponding measures of the applied pressure.

Referring to FIGS. 3A-3I, in one of the embodiments of the current fabrication process, a tip portion of the optical fiber 30 (FIG. 3A) is peeled to remove the fiber jacket 70 as shown in FIG. 3B. Subsequently, as shown in FIG. 3C, the fiber 30 is polished to create an end surface 40, and a metal layer 50 which is deposited on the polished and cleaned end surface 40, as presented in FIG. 3D, to enhance reflectivity at the boundary of the polished surface 40. The sidewalls 28 of the fiber are covered with a thin reflective layer 72 (further referred to herein as the sidewall reflective layer) to enhance visibility of the optical signal by increasing the reflectance of the outer surface of the sidewall of the optical fiber. As shown in FIG. 3E, a positive photoresist layer 74 is subsequently deposited on the reflective material 72 on the sidewalls 28 and the end surface 40. The photoresist 74 may be coated by a dipping technique with a desired thickness. The thickness of the cavity 34 depends on the viscosity of the photoresist and the dipping conditions. Subsequently, the photoresist layer is soft baked and is exposed from inside of the optical fiber to the UV light 76 which is focused on the input end 46 of the optical fiber 30.

The optical fiber, specifically the optical guide channel 44, and the 45° angled end surface 40 are used to guide the UV light toward the sidewall 28. As shown in FIG. 3F, the UV light 76 is coupled to the input end 46 of the optical fiber to travel along the optical guide channel 44 towards the reflective angled end surface 40, at which the UV light is steered 90°, and the redirected light 77 impinges on the sidewall 28 and the positive photoresist layer 74.

Being exposed to the UV light 77, the photoresist layer 74 changes its chemical characteristics at the area of exposure and becomes soluble to a photoresist developer which is subsequently applied to the photoresist layer 74 to remove the photoresist material (either by wet or dry etching), thereby forming the cavity 34 through the thickness of the photoresist layer 74 of predetermined length and diameter. As shown in FIG. 3G, the cavity 34 is formed in the photoresist layer 74 which is further hard baked to solidify the remaining photoresist in order to produce a durable cavity confining layer. The diameter of the cavity is defined by a beam spot size and may range in µm range. The depth of cavity, depending on the photoresist may be, for example, in the range of 15-24 µm.

Referring to FIG. 3H, the polymer diaphragm layer 58 having a uniform thickness is covered on the top 78 of the cavity 34. The polymer diaphragm layer 58 is preformed by the process described further herein, and at the moment of deposition on the top of the cavity 34 has adhesive properties sufficient enough to permit the securement of the diaphragm to the outside wall 28 of the optical fiber without contractions. The polymer diaphragm layer 58 is then cured by ultra violet light again and is fixed firmly on the sidewall of the fiber. The polymer diaphragm layer 58 is then coated with a reflective layer 60, shown in FIG. 3H, by either of sputtering, evaporation, electroplating, bonding, or sticking, thus completing the fabrication of the sensing head 22. The reflective layer 60 (as well as reflective layers 50 and 72) is typically made of a metal material such as, but not limited to, gold, aluminum, silver, copper, nickel, chromium, etc.

As shown in FIG. 3I, the sensor element, e.g., the Fabry-Perot cavity structure 26, may be covered with additional polymer layers 80. These additional layers of polymer render additional protection from the external environment and improve the biocompatibility of the sensor especially in biomedical applications which expose the sensors to the body fluids such as blood, urine, etc. Additional layers 80 also provide the ability to tune the stiffness of the multi-layered diaphragm 32 to address different requirements of sensitivities and pressure measurement ranges. The stiffness of the diaphragm 32 is mainly determined by the stiffness of the reflective diaphragm layer 60 since the metal material has much higher mechanical strength than the polymer material of the polymeric diaphragm layer 58. However, adding more polymer layers 80 increases the stiffness in small steps and thus offers fine tuning of the sensitivity.

Referring to FIG. 4A-4G, the subject surface-mountable optical pressure sensor 22 may be fabricated also by a laser ablation. This is an alternative method of forming the cavity 34 on the outer surface of the optical fiber 30 in a simplified manner. At first, the optical fiber 30 having the jacket 70 (shown in FIG. 4A) is polished together with the jacket to form the 45' angled end surface 40, as shown in FIG. 4B. The end surface 40 is subsequently covered with the reflective coating 50 shown in FIG. 4C. Further, as shown in FIG. 4D, the laser light 84 is guided through the optical fiber 30. At the end surface 40 the laser light is redirected toward the sidewalls 28 and impinges thereon at the location 85 where the cavity 34 is to be fabricated. This location is found by sensing the redirected laser light 82 coming from the sidewall of the fiber by a photo detector 83 compatible with the laser used. Any laser producing light in the wavelength range of approximately 600 nm-800 nm may be used. For example, commercially available laser diodes generating in the range of 635-705 nm or 700-800 nm are suitable for this application.

Further, referring to FIG. 4E, the cavity 34 is formed by removing the polymer material of the fiber jacket 70 selectively using the laser ablation. After contouring the cavity 34 by laser ablation, the reflective layer 72 is deposited, which covers the surface of the fiber jacket 70 and the exposed sidewall 28 on the bottom of the cavity 34.

In the following step, the polymer diaphragm layer 58 and the reflective diaphragm layer 60 are covered on the top 78 of the cavity 34, as shown in FIG. 4G, thus completing the formation of the sensing head 22.

Referring further to FIGS. 5A-5D, another alternative fabrication technique is carried out by making the cavity 34 by a UV molding process. The fiber jacket of the optical fiber is removed and cleaved, and the polishing and metal layer deposition are performed respectively to form the reflective end surface 40 and the sidewall reflecting layer 72 as is discussed supra and shown in FIGS. 3A-3D. Subsequently, as shown in FIG. 5A, the controlled volume of the UV-curable polymer 86 is dispensed at the sidewall in proximity to the tip of the fiber. The UV-curable material may be a polymer based on urethane acrylate, acrylate, epoxy, etc.

A mold 88 contoured opposite to the shape of the intended cavity is used in this process. The light 89 (for example, laser light) is introduced through the input end of the fiber which redirects at the end surface 40 covered with metal 50, impinges on the sidewalls 28, and escapes to the outside of the fiber through the UV-curable material 86, as it is shown in FIG. 5A.

The light beam emanating through the sidewall of the optical fiber is used for precise positioning of the mold 88. The mold is fabricated with Si, glass, polymer, or metal with an anti-adhesion surface treatment, and is mounted on a high precision stage. If the mold 88 is made of a transparent material, such as polymer or a glass, a reflective layer is coated on the mold to facilitate reflection of light. As shown in FIG. 5A, the mold 88 is positioned to be in the axial alignment with the emanating laser light by monitoring intensity of the light 92 reflected from the end facet 90 of the mold 88. When the mold 88 is precisely aligned relative to the optical axis of the emanating laser light at the position where the cavity is to be made, the reflective signal 92 reaches its maximum that is detected by the photo detector (Power Meter) 66.

After finishing the axial alignment, the mold 88 is lowered into the UV-curable polymer 86 to bring the end facet 90 in contact with the sidewall reflective layer 72, as shown in FIG. 5B. Subsequently, the UV-curable polymer 86 is cured by UV light. After the polymer 86 has been UV-cured, the mold 88 is removed, as shown in FIG. 5C, thereby leaving the cavity 34 formed in the material 86. As further presented in FIG. 5D, the polymer diaphragm layer 58 and the reflective diaphragm layer 60 are deposited on the top 78 of the cavity 34.

The fabrication technique for the subject pressure sensor embedded on the optical fiber is easily adapted for batch production that yields high device-to-device uniformity.

Referring to FIGS. 6A-6B, a fiber holder 100 may be used to hold and align a plurality of optical fibers 30. The fiber holder 100 may be used which includes both a bare silicon wafer 106 and a silicon wafer 102 where a plurality of grooves 104 are etched. In use, a plurality of optical fibers 30 with their tip portions cleared of the jackets 70, are positioned in the grooves 104 in aligned and substantially parallel relationship each to the other and covered with the bare silicon wafer 106. An adhesive, for example, a wax 108 may be used to stably secure the fibers 30 within the fiber holder 100. The optical fibers are then polished at their tips to form a 45° angled end surfaces which are cleaned and deposited with the metal layer. Further, the manufacturing steps shown in FIGS. 3E-3G are simultaneously performed for all the optical fibers held in the fiber holder 100 by dipping the tips of the fibers in the photoresist, UV-patterning and developing the photoresist in sequential order.

In order to form the polymer diaphragm layer 58 at the top of the cavities 34 formed externally on the sidewalls of the optical fibers, the polymer layer is pre-formed in a separate process. Deionized water is placed in a Petri dish. A hard ring holder 110 (shown in FIG. 6B) is placed in the Petri dish under the surface of the water. A controlled volume of a UV-curable polymer is dispensed onto the surface of the deionized water. The polymer floats over the water surface and spreads to form a thin film of polymer on the water surface. By observing the coloration of the polymer film and controlling the spreading time, the film thickness may be controlled with high accuracy. Using this technique, a very thin layer of the polymer is obtained.

The polymer layer is then pre-cured by UV light at a predetermined power density and for a predetermined time period sufficient to accomplish the pre-curing process, thereby forming the polymer layer 112, that has a uniform thickness across the entire area. At this stage, the polymer layer 112 is strong enough to be removed from the water.

The hard ring holder 110 is lifted to be contagious with the polymer layer and then is removed from the water surface at a predetermined angle to lift the pre-cured polymer layer 112 out of the water and cover the fabricated cavities at the end of the fibers, as shown in FIG. 6B. The hard ring holder 110 with the polymer film 112 is moved downwardly towards the fiber holder 100 while the fibers are pushed up to break the polymer film. As a result, each fiber end is covered with a patch of the polymer film. Since the polymer film has a uniform thickness across its entire area, the cavities 34 formed on the optical fibers, are covered with the polymer diaphragm layer of identical thickness. The polymer film at this stage has a viscosity which is sufficient to attach the polymer diaphragm to the sidewalls of the optical fibers without contractions.

Further, the diaphragms are cured by the UV light and thus are secured firmly on the sidewalls of the fibers. The polymer diaphragms are further coated with the reflective diaphragm layer 60 by sputtering, evaporation, electroplating, bonding, or sticking for all optical fibers simultaneously. The reflective material is a metal which includes gold, aluminum, silver, copper, nickel, chromium, etc. The batch production of the pressure sensors embedded on optical fibers includes well developed simple processes, safe procedures and inexpensive materials and does not need the use of clean room environment and equipment.

An alternative batch fabrication technique is presented in FIGS. 7A-7F. As shown in FIG. 7A, the cleaned optical fibers 30 are secured in a holder 101 with wax and the end faces of the fibers being polished. Subsequently, as shown in FIG. 7B, a photoresist deposition is performed on the end faces. Referring further to FIG. 7C, the photoresist is exposed to UV light via a shadow mask to pattern the photoresist and is then soft baked.

After the photoresist develops, as shown in FIG. 7D, coaxial cavities are formed in the end faces of the fibers 30. Hard baking is performed and the polymer diaphragm fiber 112 is covered on the top of the cavities, as shown in FIG. 7E. A micromachined punch 113 having a plurality of openings aligned with the end faces of the fibers is pressed down to remove the unnecessary portions of the polymer film. Finally, as shown in FIG. 7F, a metal layer 114 is deposited on the diaphragm, and wax is dissolved with heat to complete the fabrication process.

Figure 8A:
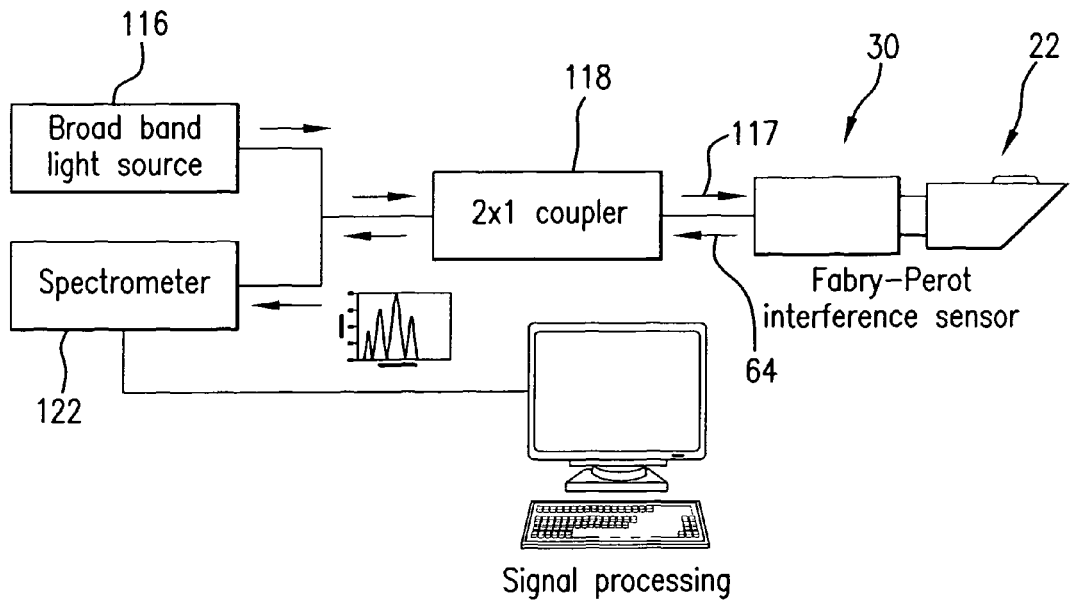
FIGS. 8A-8B show, respectively, a spectrum-based measurement scheme and a diagram representing cavity length vs. pressure of the manufactured pressure sensor.

Referring again to FIG. 2, the cavity length L of the optical pressure sensor depends on the pressure 38 applied perpendicularly to the diaphragm 32 formed on the top of the cavity 34. When the pressure is applied, the diaphragm deflects and the length of the optical cavity changes. The deflection of the diaphragm 32 is proportional to the pressure and may be measured by several optical signal processing methods including spectrum based measurements and intensity-based measurements. The principles of the spectrum based measurements are shown in FIG. 8A where white light may be used as an input light source 116. The white light 117 travels to the sensing head 22 through a 2×1 coupler 118. In the fiber 30, as shown in FIG. 2, the light travels along the optical guide channel towards the reflective angled end surface and is redirected (beam 54) toward the sidewall 28 of the optical fiber. At the sidewall reflective layer 72, a portion 120 of the light beam is reflected, while another portion of the redirected light beam 54 passes through the sidewall reflective layer 72 and travels along the length of the optical cavity 34 and reflects (as shown by the arrow 62) at the boundary between the top 78 of the cavity 34 and the diaphragm 32. Both reflected light beams, 120 and 62, interfere with each other on their return inside the fiber, and when the spectrum of the output light signal 64 is scanned by a spectrometer (or an optical spectrum analyzer) 122, some peaks would appear on the spectrum diagram. The cavity length is calculated by (Eq. 1):

$$L = \frac{\lambda_1 \lambda_2}{2(\lambda_2 - \lambda_1)} \quad \text{(Eq. 1)}$$

where L is the cavity length, and λ1, λ2 represent the wavelengths of two adjacent peaks found on the spectrum diagram.

Figure 8B:
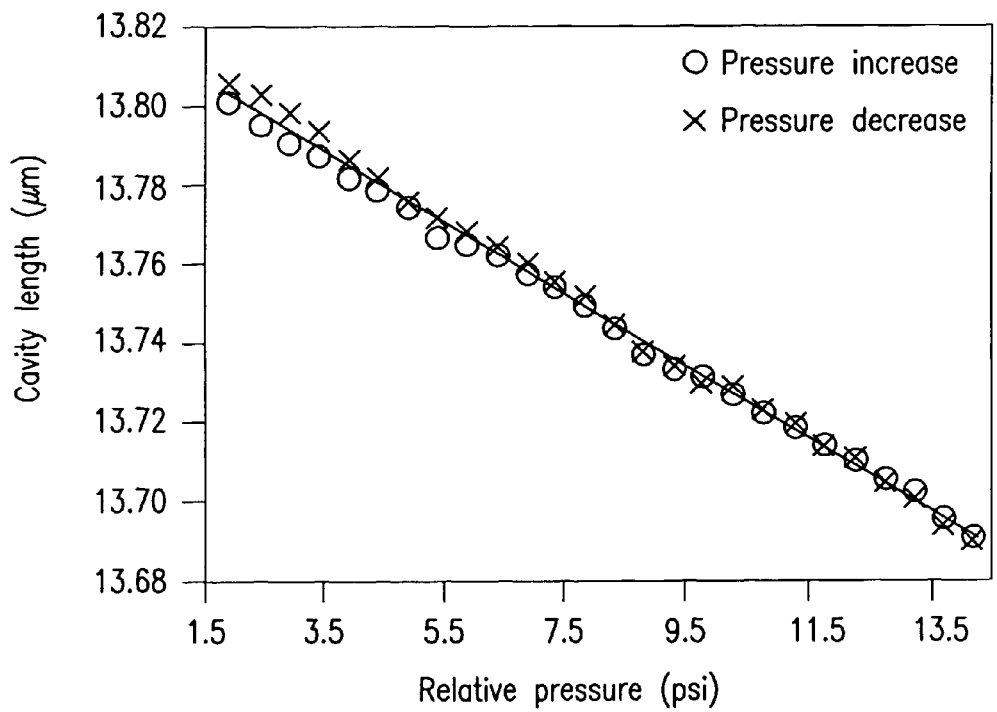

Since the wavelength measurement has high resolution (~1 μm), the deflection of the diaphragm 32 may be measured with the accuracy of 10 nm. Such a high resolution ensures that very small deflection of the diaphragm is detected with high precision. FIG. 8B represents a diagram of the cavity length vs. pressure. The spectrum based measurements have enhanced sensitivity, rather large dynamic range and are insensitive to light source fluctuations.

An intensity-based measurement scheme (not shown in the drawings), uses a light source generating the light whose coherence length is much longer than the cavity length. The light from the light source passes through a coupler into the input end of the sensing head. The interference between the light beams, 120 and 62, shown in FIG. 2, causes intensity variation of the output optical signal with respect to the optical phase difference between lights 120 and 62. The intensity variation is calculated by (Eq. 2), $$I = I_1 + I_2 + \sqrt{2I_1 I_2} \cos \phi \quad \text{(Eq. 2)}$$

where $$\phi = 4 \pi n L / \lambda \quad \text{(Eq. 3)}$$

where L is the cavity length, $I_1$ and $I_2$ represent the intensity of the light reflected from the outer sidewall of the fiber and the diaphragm reflective layer, respectively, $\phi$ is a phase shift defined by refractive index n of the cavity medium, the cavity length L, and $\lambda$ is the wavelength of the light generated by the light source. The intensity of the output optical signal 64 is measured by a power meter (photodiode). The deflection of the diaphragm 32 due to the outside pressure 38 thus may be measured with high accuracy.

In order to correlate the applied pressure field with the optical characteristics of the output optical signal 64, the sensor calibration is performed with the use of a reference sensor. To calibrate the manufactured sensor, any type of commercially available well calibrated pressure sensor may be used. In the present study, a Kulite sensor was used as a reference for static pressure calibration. Pressure reading was made from the reference sensor, and the cavity length was measured at the same time with the optical interrogation system shown in FIG. 8A. From the calibration, the relationship between the cavity length and the pressure was attained. This relation was exploited in calculating actual pressure from the cavity length values.

Sensor calibration was performed on the fabricated cavity having length L approximately 14 µm with Ni/Ti coating on the diaphragm of 0.3 µm thickness. Linear relationship was obtained between optical power and static external pressure in the pressure range for calibration between 0-20 psi. A sensitivity of 0.009 µm/psi was attained with the sensor calibration.

The sensing heads 22 are envisioned as a part of a variety of sensor systems 20 using one or an array of the subject sensing heads. For example, as shown in FIG. 9, the sensor system 20 uses a single sensing head 22 on the substrate 24 optically coupled through a 1×2 coupler 134 to the optical MEMS (microelectromechanical) chip 135. The MEMS chip 135 carries a SLED chip 132 to produce a light signal 133 which passes through a Fabry-Perot filter 136 and the coupler 134 prior to being optically coupled to the fiber 30 (light 52). The output optical signal 64, which carries information on the pressure applied to the diaphragm 32, passes through the coupler 134 to the photo diode 123, and is processed by the microcontroller (or microprocessor) 68 to generate measurements of the pressure of interest.

The sensing head 22 is also envisioned as a part of integrated sensor networks, including spatial-division-multiplexing (SDM) systems with a plurality of sensing heads 22 and the optical MEMS (microelectromechanical systems) chip which integrates a signal processing element.

Figure 10:
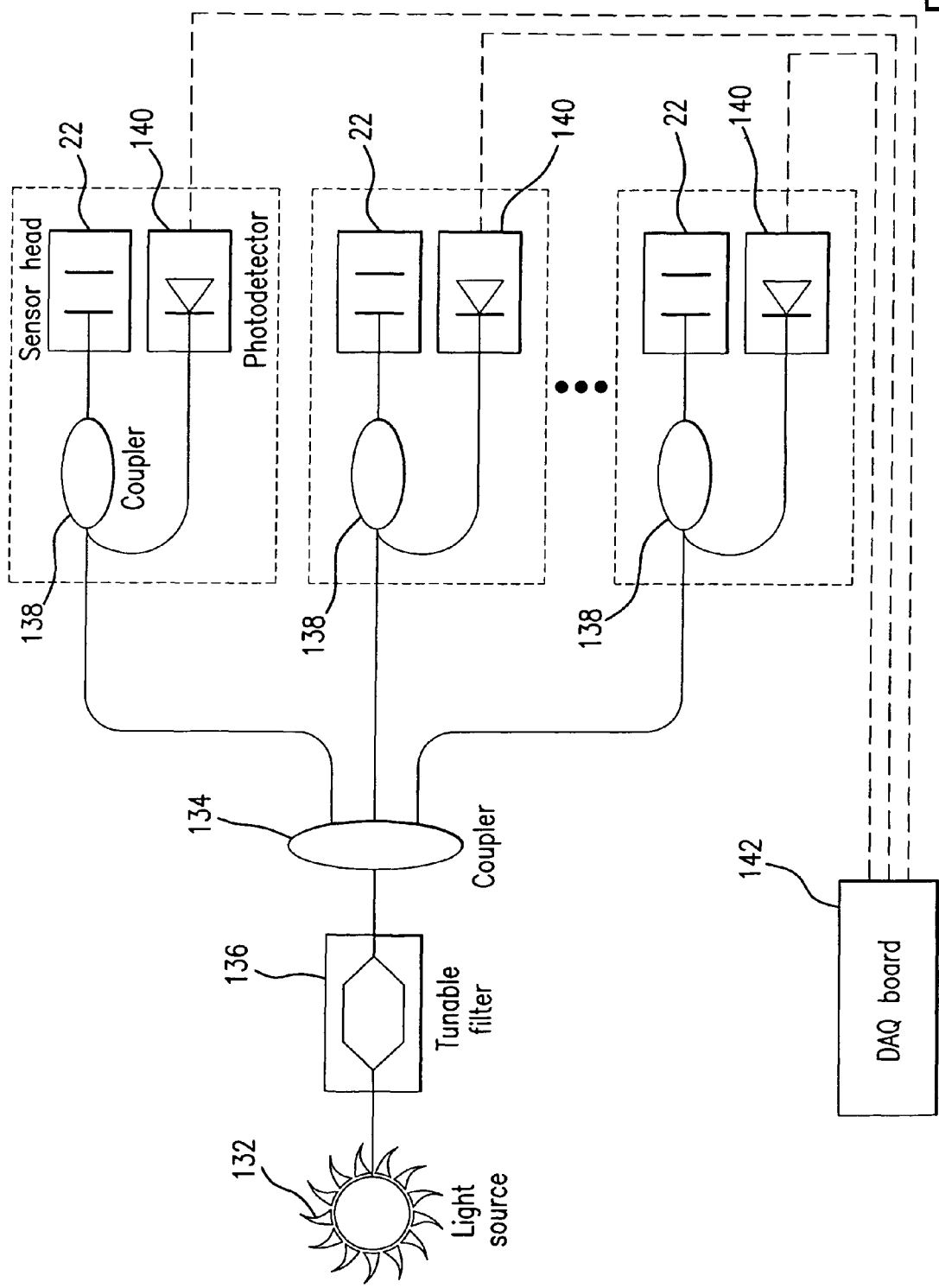
FIG. 10 is a schematic representation of an integrated sensor network using an array of the sensing elements of the present invention.

Shown in FIG. 10, is a low coherence fiber optic interferometer (LCFOI) system that may be used to measure dynamic response of the Fabry-Perot pressure sensor. Light from a broadband source 132 (such as, for example, a superluminescent light emitting diode (SLED)) is first sent to a 1×N coupler 134 via a tunable Fabry-Perot filter 136 that serves as a reference interferometer. The light from each of the output ports of the 1×N coupler 134 is then sent to several (depending on the number N of sensors) 1×2 couplers 138. At the output of each coupler 138, the light beam is directed to a Fabry-Perot (FP) interferometer based pressure sensing head 22, acting as the sensing interferometer. The reflected light from each FP sensor 22 is then coupled back to a photo detector 140.

Maximum sensitivity may be achieved when the initial differential optical path difference (OPD) is at the vicinity of quadrature points, i.e.

$$OPD = L_s - L_r = \frac{2m-1}{4}\lambda \quad \text{(Eq. 4)}$$

where $L_r$ and $L_s$ are the cavity length of the reference interferometer and the sensing interferometer, respectively, and $m = 0, \pm 1, \pm 2 \ldots$ The obtained signal which is proportional to the measured pressure is sent to an oscilloscope for display or to a data acquisition board 142 for data analysis. This configuration is a tree topology spatial-division multiplexing sensor network, which may be used to interrogate an array of the miniature pressure sensors 22. This scheme is applicable both with the cross-axial sensing heads 22, and co-axial sensing heads.

In the integral approach on a single substrate shown in FIG. 9, the resulting footprint may be about 1.5×2. Total sensor height of less than 200 µm has been achieved with the present design.

The miniature surface-mountable fiber-optic pressure sensor of the present invention is mounted on a surface and measures with high precision dynamic pressure directed perpendicular to the surface. By using the optical fiber and the angled end surface as the light guide to expose photoresist for forming the cavity, an accurate position of the cavity may be attained which is satisfied without the use of high accuracy masks or alignment systems. In the design using a fiber jacket as a cavity confining layer, a relatively thick cavity may be obtained by the laser machining, wet etching, and dry etching in an efficient and inexpensive way. The versatility of the subject method allows the use of the UV imprint lithography for formation of the cavity where a mold is used made of Si, glass or metal with anti-adhesion surface treatment.

The formed sensor is fully bio-compatible since it is covered with protective polymer layers. Also, the coarse and fine tuning of the diaphragm stiffness may be attained by adjusting metal layer thickness and/or the diameter of cavity, to address different applications, which have different pressure ranges and require different sensitivities, by controlling the number of polymer layers on the composite diaphragm and the diameter of the Fabry-Perot cavity.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A surface-mountable ultra-miniature fiber-optic pressure sensor system, comprising:
at least one sensing head, said at least one sensing head being formed on an optical fiber having an optical guide channel defined within sidewalls and extending between an input end and a tip end of said optical fiber, wherein said tip end of said optical fiber is formed with an end surface angled substantially at 45° relative to an optical axis of said optical guide channel of said optical fiber and covered with a first reflective layer, wherein said reflective angled end surface redirects light traveling along said optical guide channel from said input end toward said tip end to impinge on said sidewall of said optical fiber at a predetermined location thereof; and a Fabry-Perot cavity structure formed at said predetermined location at said sidewalls of said optical fiber;

wherein optical characteristics of an optical output signal emanating from the input end of said optical fiber correspond to a pressure applied to said Fabry-Perot cavity structure.

2. The surface-mountable ultra-miniature fiber-optic pressure sensor system of claim 1, wherein said Fabry-Perot cavity structure includes:

a cavity confining layer formed on said sidewalls, said cavity confining layer having a cavity formed through the thickness thereof, and a diaphragm formed on said cavity confining layer and covering a top of said cavity, said diaphragm including a polymer diaphragm layer and a reflective diaphragm layer covering said polymer diaphragm layer.

3. The surface-mountable ultra-miniature fiber-optic pressure sensor system of claim 2, further comprising at least one additional polymer layer formed on said reflective diaphragm layer.

4. The surface-mountable ultra-miniature fiber-optic pressure sensor system of claim 2, wherein said cavity confining layer is a photoresist layer.

5. The surface-mountable ultra-miniature fiber-optic pressure sensor system of claim 2, wherein said cavity confining layer is a jacket of said optical fiber.

6. The surface-mountable ultra-miniature fiber-optic pressure sensor system of claim 2, wherein said cavity confining layer is an UV-curable material deposited on said sidewalls of said optical fiber at said predetermined location thereof.

7. The surface-mountable ultra-miniature fiber-optic pressure sensor system of claim 1, further comprising a substrate supporting said at least one sensing head.

8. The surface-mountable ultra-miniature fiber-optic pressure sensor system of claim 7, further comprising at least one light source generating an optical input signal coupled to said input end of said optical fiber of said at least one sensing head, at least one light detector optically coupled to said at least one sensing head to detect said optical output signal emanating therefrom, and a signal processing unit coupled to said at least one light detector to determine said characteristics of said optical output signal.

9. The surface-mountable ultra-miniature fiber-optic pressure sensor system of claim 2, further comprising a second reflective layer formed on said sidewall at said predetermined location thereof, wherein said first and second reflective layers, and said reflective diaphragm layer are made from a metal material.

10. A method for manufacturing a surface-mountable ultra-miniature fiber-optic pressure sensor system, comprising the steps of:

fabricating at least one sensing head by:

(a). contouring a tip end of an optical fiber with an end surface angled at substantially 45° relative to an optical guide channel defined by sidewalls of said optical fiber, (b). depositing a first reflective layer on said end surface, (c). inputting a light beam at an input end of said optical fiber, wherein said light beam travels from said input end toward said tip end of said optical fiber along said optical guide channel thereof and redirects at said reflective angled end surface toward a predetermined location at said sidewalls of said optical fiber, and (d). forming a Fabry-Perot cavity structure at said predetermined location of said sidewalls of said optical fiber, said Fabry-Perot cavity structure having a cavity and a diaphragm covering a top of said cavity.

11. The method of claim 10, further comprising the steps of:

prior to said step (a), removing a fiber jacket from said optical fiber; and prior to said step (c), covering said sidewalls with a second reflective layer; and depositing a photoresist layer on said second reflective layer;

wherein in said step (c), said light beam is a UV light beam, and wherein in said step (d), said photoresist layer is exposed to said UV light beam traveling along said optical guide channel and redirected by said reflective angled end surface toward said sidewalls, thereby UV-patterning said photoresist layer at said predetermined location, and removing said photoresist layer from said predetermined location, thereby forming said cavity of said Fabry-Perot cavity structure.

12. The method of claim 10, wherein in said step (c), said light beam is a laser beam, further comprising the steps of:

prior to said step (d), determining said predetermined location by sensing a laser light beam emanating through said sidewalls of said optical fiber, in said step (d), forming said cavity of said Fabry-Perot cavity structure by exposing a fiber jacket to a material subtraction technique from outside of said fiber jacket to remove the fiber jacket material at said predetermined location, and after said step (d), depositing a second reflective layer at least on said sidewalls defined within said cavity.

13. The method of claim 10, wherein in said step (c), said light beam is a laser beam, further comprising the steps of:

prior to said step (a), removing a fiber jacket from said optical fiber to expose said sidewalls thereof:

prior to said step (c), covering said sidewalls with a second reflective layer;

prior to said step (d), depositing a predetermined volume of a UV-curable material on said second reflective layer in proximity to said tip end of said optical fiber; and in step (d), positioning a mold above said UV-curable material in alignment with said predetermined location, said mold having a shape opposite to a contour of said cavity, lowering said mold through said UV-curable material to attain a contiguous contact with said second reflective layer, curing said UV-curable material; and removing said mold therefrom.

14. The method of claim 13, further comprising the steps of:

prior to the step of lowering said mold, finding an alignment of said mold with said predetermined location when said optical output signal corresponding to a laser light beam reflected from said mold reaches maximal power.

15. The method of claim 10, further comprising the steps of:

in said step (d), forming said diaphragm by covering the top of said cavity with a polymer diaphragm layer, and covering said polymer diaphragm layer with a reflective diaphragm layer.

16. The method of claim 15, further comprising the steps of:
prior to covering said polymer diaphragm layer on the top of said cavity,
pre-forming said polymer diaphragm layer having a uniform thickness in a nanometer-scale range.

17. The method of claim 15, further comprising the step of:
tuning a sensitivity of said at least one sensing head by controlling a number of additional polymer layers covered on said reflective diaphragm layer.

18. A method of manufacturing a plurality of ultra-miniature fiber-optic pressure sensors, comprising the steps of:
removing a fiber jacket from an end area of each of a plurality of optical fibers to expose sidewalls thereof,
securing said plurality of optical fibers to a holding member in alignment each with the other,
polishing the tips of said plurality of optical fibers to form end surfaces angled at a predetermined angle relative to an optical guide channel of each optical fiber,
forming a cavity confining layer at a predetermined location of said plurality of optical fibers, said predetermined location including a location selected from a group consisting of: said sidewalls of said optical fibers, said end surfaces of said optical fibers, and combinations of said sidewalls and said end surfaces, and
forming a Fabry-Perot cavity structure at said predetermined location by the steps of:

(a) removing a material of said cavity confining layer to form a cavity of predetermined dimensions through the thickness of said cavity confining layer,
(b) pre-forming a polymer diaphragm film of a uniform thickness,
(c) covering said pre-formed polymer film on tops of said cavities of said plurality of optical fibers, thereby forming a polymer diaphragm layer of each said Fabry-Perot cavity structure, and
(d) coating a reflective diaphragm layer on said polymer diaphragm layer.

19. The method of claim 18, further comprising the steps of:
in said step (b), placing a loop-shaped holder under a surface of a body of deionized water,
dispensing a predetermined amount of a UV-curable polymer on said body of deionized water to form a thin polymer film,
pre-curing said thin polymer film with UV-light, and
removing said loop-shaped holder from the deionized water, thereby removing said pre-cured thin polymer film.

20. The method of claim 18, wherein said predetermined angle is selected form a group consisting of 45° and 90°.

* * * * *